(12) United States Patent
Sampat et al.

(10) Patent No.: US 11,323,529 B2
(45) Date of Patent: May 3, 2022

(54) TCP FAST OPEN HARDWARE SUPPORT IN PROXY DEVICES

(71) Applicant: A10 NETWORKS, INC., San Jose, CA (US)

(72) Inventors: Rishi Sampat, San Jose, CA (US); Rajkumar Jalan, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 735 days.

(21) Appl. No.: 15/652,820

(22) Filed: Jul. 18, 2017

(65) Prior Publication Data
US 2019/0028559 A1    Jan. 24, 2019

(51) Int. Cl.
| | | |
|---|---|---|
| *H04L 67/56* | (2022.01) | |
| *H04L 69/168* | (2022.01) | |
| *H04L 67/01* | (2022.01) | |
| *H04L 69/326* | (2022.01) | |
| *H04L 69/163* | (2022.01) | |
| *H04L 67/02* | (2022.01) | |
| *H04L 67/563* | (2022.01) | |

(52) U.S. Cl.
CPC ............. *H04L 67/28* (2013.01); *H04L 67/02* (2013.01); *H04L 67/2814* (2013.01); *H04L 67/42* (2013.01); *H04L 69/163* (2013.01); *H04L 69/168* (2013.01); *H04L 69/326* (2013.01)

(58) Field of Classification Search
CPC ..... H04L 67/28; H04L 67/02; H04L 67/2814; H04L 67/42; H04L 69/163; H04L 69/168; H04L 69/326
See application file for complete search history.

(56) References Cited

U.S. PATENT DOCUMENTS

| | | | | |
|---|---|---|---|---|
| 6,374,359 | B1 * | 4/2002 | Shrader | H04L 29/06 709/229 |
| 9,749,354 | B1 * | 8/2017 | Diggins | H04L 63/1458 |
| 2005/0240989 | A1 * | 10/2005 | Kim | H04L 63/0254 726/11 |
| 2007/0195792 | A1 * | 8/2007 | Chen | H04L 47/10 370/395.52 |
| 2013/0263245 | A1 * | 10/2013 | Sun | H04L 63/0209 726/12 |
| 2014/0325588 | A1 * | 10/2014 | Jalan | H04L 63/1466 726/1 |
| 2014/0330982 | A1 * | 11/2014 | Jalan | H04L 63/0892 709/229 |
| 2018/0034681 | A1 * | 2/2018 | Shima | H04L 47/193 |
| 2018/0288179 | A1 * | 10/2018 | Bhatia | H04L 69/08 |

* cited by examiner

*Primary Examiner* — Jason D Recek
(74) *Attorney, Agent, or Firm* — Keith Kline; The Kline Law Firm PC

(57) ABSTRACT

Systems and methods for TCP fast open support in proxy devices are provided. An example system may include at least one circuit and at least one data plane communicatively coupled to the circuit. The circuit may be configured to receive at least one SYN packet. The at least one SYN packet is associated with at least one client device and includes a cookie. The circuit can be configured to validate the cookie. If the result of the validation is positive, the data plane can be configured to initiate, based on the at least one SYN packet, a connection between the at least one client device and at least one server. If the result of the validation is negative, the circuit can be configured to generate, based on the SYN packet, a new cookie and send a SYN-ACK packet to the client, the SYN-ACK packet including the new cookie.

18 Claims, 4 Drawing Sheets

TCP FAST OPEN HARDWARE SUPPORT IN PROXY DEVICES

TECHNICAL FIELD

This disclosure relates generally to data networks and, more particularly, to systems and methods for Transmission Control Protocol (TCP) fast open hardware support in proxy devices.

BACKGROUND

Transmission control protocol (TCP) allows data exchange between a client and a server only after a handshake is performed. When a TCP connection initiates, the server receives a synchronization/start (SYN) packet from the client and, in response, sends a synchronize acknowledgement (SYN-ACK). The server then waits to receive an acknowledgement (ACK) of the SYN-ACK from the client before the TCP connection between the client and the server can be established. This procedure is commonly known as a "three-way-handshake" (THS).

The THS can to be exploited by denial of service attackers, for example, to perform TCP SYN flood attacks. Other disadvantages of the THS include delays in data flow between the client and the server due to the requirement of establishing an individual TCP connection for each short data transmission.

A TCP fast open (TFO) protocol was introduced to overcome the above-mentioned disadvantages of the THS. According to the TFO protocol, a client may request a secure cookie (also referred to as a TFO cookie) from a server during, for example, a TCP connection initiated by the THS. The client may use the secure cookie to carry out fast opening in subsequent connections to the same server. The TFO cookie may include an encrypted Internet Protocol (IP) address of the client. The client may send a SYN with the TFO cookie and data load to the server. The server may validate the TFO cookie. If the TFO cookie is valid, the TCP connection between the client and the server is established. The server may send the data to an application installed on the server and ACK to the client to acknowledge receiving the SYN packet and the data load.

The server is required to have appropriate capabilities for generation and verification of the cookie. The generation of the TFO cookie can involve encryption of the IP address of the client. The verification of the TFO cookie can include decrypting the cookie to obtain the IP address and comparing the decrypted IP address to the IP address of the client. Even though decryption and verification is faster than sending a SYN-ACK to the client and receiving an ACK back from the client, these procedures still require considerable resources of the server that may cause time delays in data transmissions.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one approach of the present disclosure, a system for TCP fast open support in a proxy device is provided. Specifically, the system may include at least one circuit and at least one data plane communicatively coupled to the circuit. The circuit can be configured to receive at least one SYN packet. The SYN packet can be associated with at least one client device and include a cookie. The circuit can be further configured to validate the cookie. If the result of the validation is positive, the data plane can be configured to initiate, based on the SYN packet, a connection between the client device and at least one server. In some embodiments, the circuit includes a filed-programmed gate array.

In some embodiments, to validate the cookie, the circuit can be configured to acquire, based on the SYN packet, a first Internet Protocol (IP) address associated with the at least one client device. The circuit can be further configured to decrypt the cookie in order to obtain a second IP address. The circuit can be further configured to match the first IP address and the second IP address.

In some embodiments, to validate the cookie, the circuit can be configured to acquire a time of generation of the cookie. The circuit can be further configured to determine whether the time has expired.

In some embodiments, if the result of validation of the cookie is negative, the circuit can be further configured to generate, based on the SYN packet, a new cookie. The circuit can be further configured to send a SYN-ACK packet to the client. The SYN-ACK packet may include the new cookie. The circuit can be further configured to receive an ACK packet from the client. The ACK packet may include the new cookie. The circuit can be further configured to validate the new cookie.

In some embodiments, the circuit can be configured to determine that the SYN packet includes a cookie request. In response to the determination, the circuit can be configured to generate, based on the SYN packet, a new cookie. The circuit can also be configured to send a SYN-ACK packet to the at least one client. The SYN-ACK packet may include the new cookie. In some embodiments, the data plane can be further configured to manage a queue including the SYN packet.

In some embodiments, the data plane can be further configured to determine whether the SYN packet includes application data. The data plane can be further configured to select, based on the SYN packet, the server from a list of servers. The data plane can be further configured to deliver the application data to the selected server.

According to another approach of the present disclosure, a method for TCP fast open support in a proxy device is provided. The method may commence with receiving, by at least one circuit, at least one SYN packet. The at least on SYN packet can be associated with at least one client device and include a cookie. The method may further include validating the cookie by the circuit. If the result of the validation is positive, the method can initiate, by at least one data plane communicatively coupled to the circuit and based on the SYN packet, a connection between the client device and at least one server. If the result of the validation is negative, the method may include generating, by the circuit, a new cookie and sending a SYN-ACK packet to the client device. The SYN-ACK packet may include the new cookie.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. While some embodiments of the present disclosure are described as implemented using a field-programmed gate array (FGPA), the methods described may be also be implemented in hardware utilizing either a combination of microprocessors or other specially designed application-specific integrated circuits (ASIC), programmable logic devices, or various combinations thereof.

The embodiments of the present disclosure are directed to techniques for TCP fast open connections. Some embodiments may provide systems and methods for TCP fast open support in proxy devices. An example system for TCP fast open support in a proxy device may include at least one circuit and at least one data plane communicatively coupled to the circuit. The circuit can be configured to receive at least one SYN packet. The SYN packet can be associated with at least one client device and include a cookie. The circuit can be further configured to validate the cookie. If the result of the validation is positive, the data plane can be configured to initiate, based on the SYN packet, a connection between the client device and at least one server.

Figure 1:
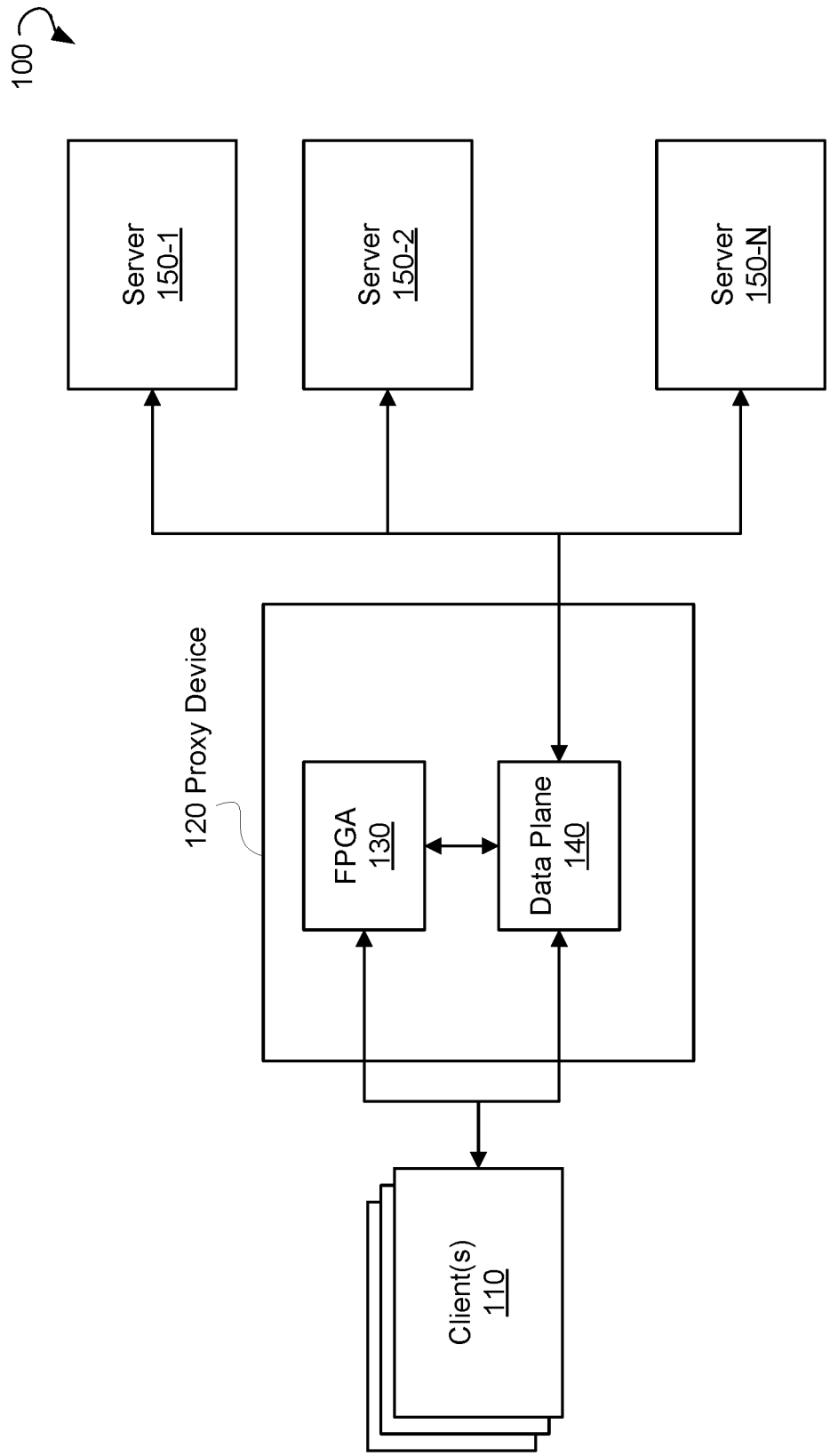
FIG. 1 is a block diagram showing an example environment, within which methods and systems for Transmission Control Protocol (TCP) fast open hardware support in proxy devices can be implemented.

Referring now to the drawings, FIG. 1 illustrates an environment 100 within which methods and systems for TCP fast open support in proxy devices can be implemented. The environment 100 may include one or more client(s) 110 (also referred to as client devices), a proxy device 120, and one or more servers 150-I (I=1, . . . , N), also referred to as back end servers or application servers.

In various embodiments of the present disclosure, the client(s) 110, proxy device 120, and servers 150-I (I= 1, . . . , N) can be configured to be communicatively connected by a data network. The data network may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34 bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that may be interconnected for the purpose of data communication.

The client(s) 110 may include a personal computer (PC), a laptop, a smartphone, a tablet PC, a television set, a mobile phone, an Internet phone, a netbook, a home gateway, a broadband gateway, a network appliance, a set top box, a media server, a personal media player, an access gateway, a networking switch, a server computer, a network storage computer, and so forth. When using the services, a user may use the client(s) 110 to send data traffic to servers 150-I (I= 1, . . . , N).

The servers 150-I (I=1, . . . , N) can include computing resources (hardware and software) available at a remote location and accessible over the data network. The servers 150-I (I=1, . . . , N) can be shared by multiple client(s) 110 and can be dynamically re-allocated based on demand. The servers 150-I (I=1, . . . , N) may include one or more server farms/clusters including a collection of computer servers which can be co-located with network switches and/or routers. The client(s) 110 can be configured to send data to servers 150-I (I=1, . . . , N), request computational operations to be performed by the servers, and receive the results of the computational operations.

In various embodiments of the present disclosure, the proxy device 120 can be configured to establish connections between the client(s) 110 and the backend servers 150-I (I=1, . . . , N). The proxy device 120 may be configured to direct data traffic from the client(s) 110 to the one or more backend servers 150-I (I=1, . . . , N) and from the backend servers 150-I (I=1, ..., N) to the client(s) 110. In some embodiments, the proxy device 120 may include at least one processor and a memory storing software to be executed by one or more processors or microprocessors, FPGAs, ASICs, and combinations thereof. The software may include a queue manager, a load balancer, application delivery system, distributed denial of service protection, data traffic encryption, IPV4 preservation and IPV6 transition, firewall, and so forth.

Figure 2:
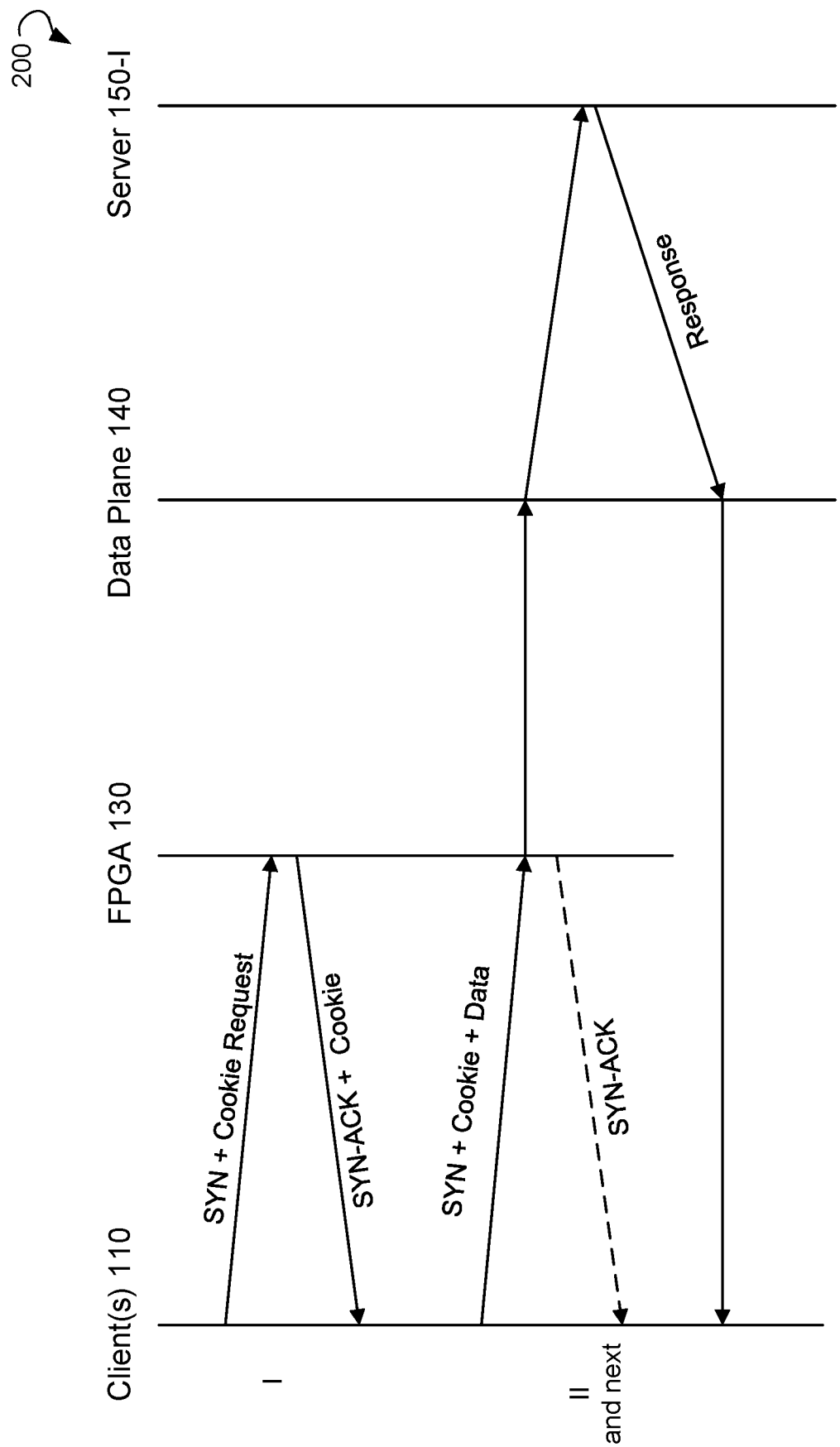
FIG. 2 is a block diagram showing functionality of components of a proxy device, according to some example embodiments.

In some embodiments of the present disclosure, the proxy device 120 may include at least a FPGA 130 and a data plane 140. FIG. 2 is a schematic showing functionalities of the FPGA 130 and the data plane 140. In some embodiments, the data plane 140 can be implemented as instructions stored in the memory and executable by at least one processor or microprocessors.

In some embodiments FPGA 130 may be configured to generate and verify cookies. At first request for connection, the client(s) 110 may be configured to send a SYN packet with a cookie request to the proxy device 120. The FPGA 130 may be configured to generate a cookie (for example, a TFO cookie) in response to the cookie request. Upon generation of the cookie, the proxy device 120 may be configured to send a SYN-ACK packet with the generated cookie to the client(s) 110 to be used in further SYN packets. At second and further requests for connection, client(s) 110 can be configured to send a SYN packet with a cookie and data to the proxy device 120.

In some embodiments, the FPGA 130 may be configured to verify the cookie. To validate the cookie, the FPGA 130 may be configured to acquire, based on the SYN packet, an IP address associated with the client 110. The FPGA 130 may be further configured to decrypt the cookie to receive a decrypted IP address. The FPGA 130 may be further configured to determine whether the decrypted IP address matches the IP address associated with client 110. In some embodiments, the FPGA may be configured to determine a time when the cookie was generated and invalidate the cookie if the time has expired.

If result of the cookie verification is positive, the FPGA 130 can notify the data plane 140 of the result of the cookie verification. After the cookie is verified, the FPGA 130 may be configured to send SYN-ACK packet to the client 110. If the cookie is invalid or expired, the FPGA 130 may be configured to generate a new cookie and send the new cookie to the client 110, which can complete the THS with client 110. The new cookie can be partially integrated by encrypting the IP address of the client 110. The FPGA 130 can be further configured to notify the data plane 140 when the THS is complete. Because the generation and verification of cookies can be performed by the FPGA 130, this approach may reduce time for handling SYN packets by the proxy device 120.

In some embodiments of the present disclosure, the data plane 140 can be configured at least to carry out queue management and selection of the back end server in response receiving a request from client 110. In response to receiving a notification from FPGA 130 that the cookie included in the request of the client 110 is valid, data plane 140 can proceed with selecting one of the back end server 150-I (1, ..., N) and initiation of a connection between the selected server and the client 110. The selected server may deliver data to one or more server applications and send a response to the client 110 via the data plane 140. Some of the servers may be configured to include TFO functionalities of generation and verification of cookies. However, the TFO functionalities of these servers may not be required because the generation and verification of the cookies can be performed by FPGA 130, which may lead to reduced time available for handling SYN packets received from the client(s) 110.

Figure 3:
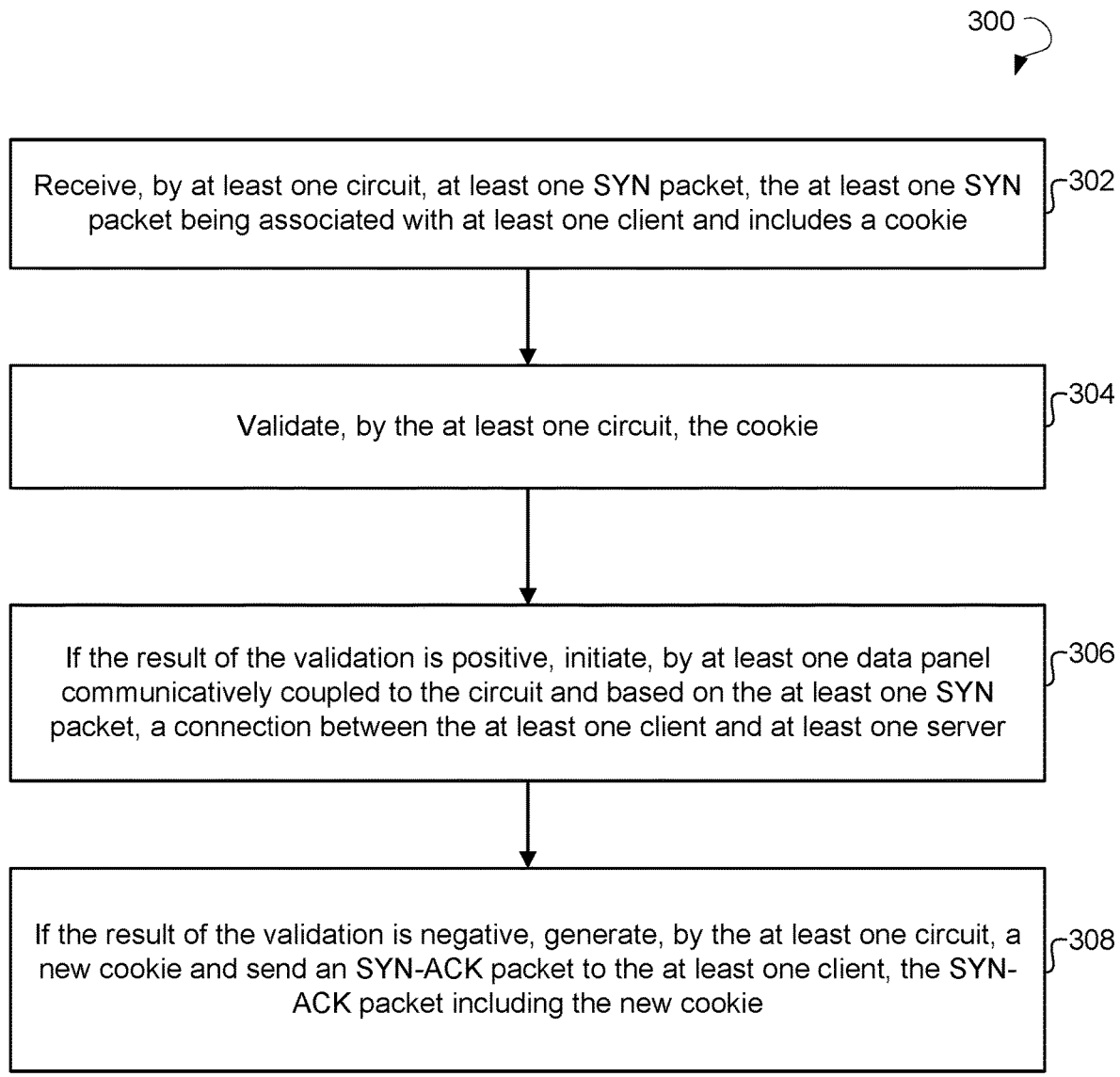
FIG. 3 shows a process flow diagram of a method for TCP fast open support in proxy devices, according to an example embodiment.

FIG. 3 is a process flow diagram of a method 400 for TCP fast open support in proxy devices, according to an example embodiment. In some embodiments, the operations of the method 300 can be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both. Specifically, the method 300 may be performed by proxy device 120 shown in FIG. 1.

The method 300 may commence, in block 302, with receiving, by at least one a circuit, at least one SYN packet. The at least one circuit may include FPGA 130. The SYN packet can be associated with at least one client 110. The SYN packet may include a cookie. In block 304, the method 300 may proceed with validating the cookie by the circuit. If the result of the validation is positive, the method 300 may include initiating, in block 306, by a data plane communicatively coupled to the circuit and based on the at least one SYN packet, a connection between the at least one client 110 and at least one server 150-I (I=1, ..., N).

If the result of the validation is negative, the method 400 may proceed, in block 408, with generating, by the circuit, a new cookie and sending an SYN-ACK packet to the client 110. The SYN-ACK packet may include the new cookie.

Figure 4:
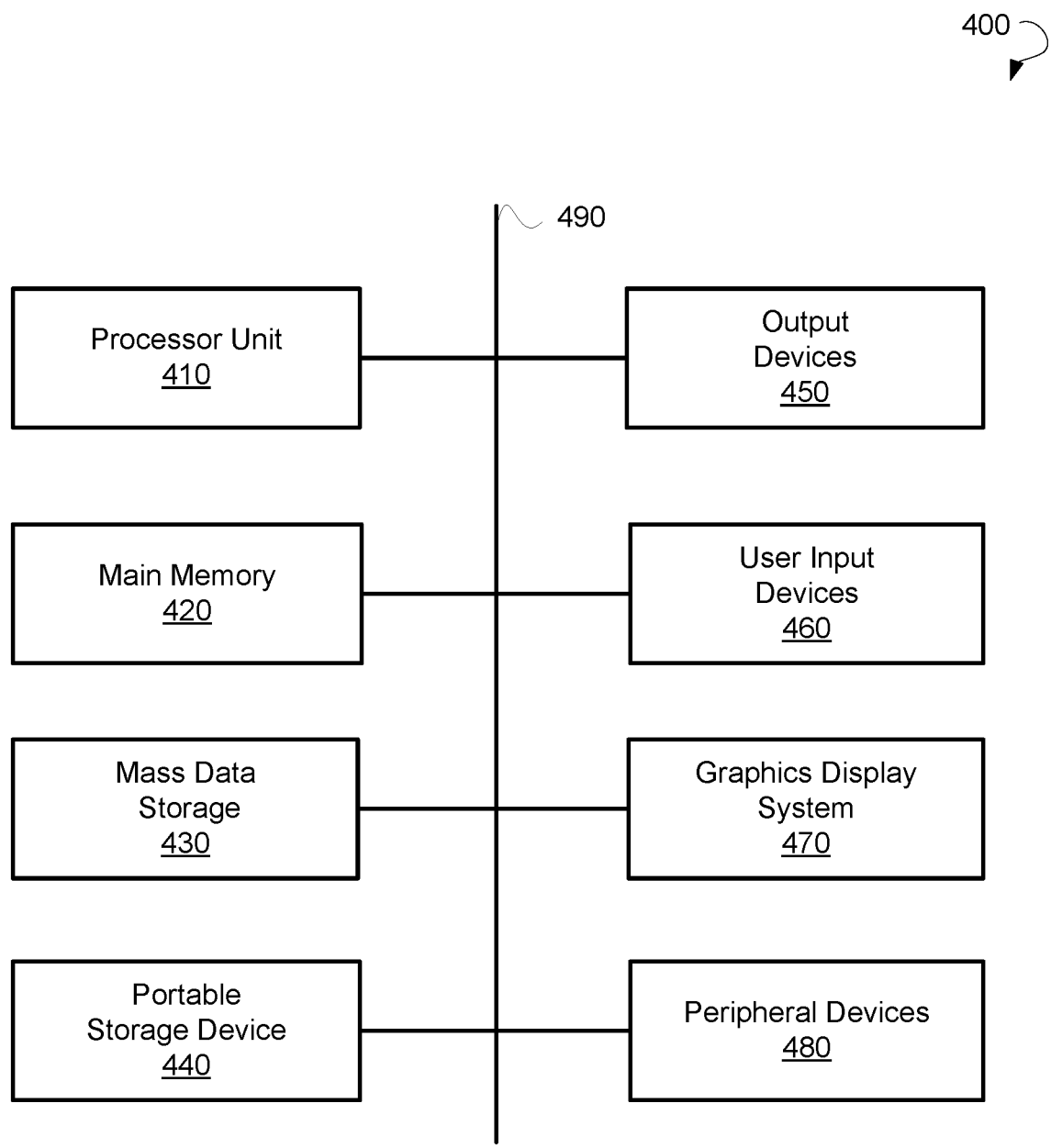
FIG. 4 shows a diagrammatic representation of a computing device for a machine, within which a set of instructions for causing the machine to perform any one or more of the methodologies discussed herein, can be executed.

FIG. 4 illustrates a computer system 400 that may be used to implement embodiments of the present disclosure, according to an example embodiment. The computer system 400 may serve as a computing device for a machine, within which a set of instructions for causing the machine to perform any one or more of the methodologies discussed herein can be executed. The computer system 400 can be implemented in the contexts of the likes of computing systems, networks, servers, or combinations thereof. The computer system 400 includes one or more processor units 410 and main memory 420. Main memory 420 stores, in part, instructions and data for execution by processor units 410. Main memory 420 stores the executable code when in operation. The computer system 400 further includes a mass data storage 430, a portable storage device 440, output devices 450, user input devices 460, a graphics display system 470, and peripheral devices 480. The methods may be implemented in software that is cloud-based.

The components shown in FIG. 4 are depicted as being connected via a single bus 490. The components may be connected through one or more data transport means. Processor units 410 and main memory 420 are connected via a local microprocessor bus, and mass data storage 430, peripheral devices 480, the portable storage device 440, and graphics display system 470 are connected via one or more I/O buses.

Mass data storage 430, which can be implemented with a magnetic disk drive, solid state drive, or an optical disk drive, is a non-volatile storage device for storing data and instructions for use by processor units 410. Mass data storage 430 stores the system software for implementing embodiments of the present disclosure for purposes of loading that software into main memory 420.

The portable storage device 440 operates in conjunction with a portable non-volatile storage medium, such as a floppy disk, a Compact Disk (CD), a Digital Versatile Disc (DVD), or USB storage device, to input and output data and code to and from the computer system 400. The system software for implementing embodiments of the present disclosure is stored on such a portable medium and input to the computer system 400 via the portable storage device 440.

User input devices 460 provide a portion of a user interface. User input devices 460 include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 includes output devices 450. Suitable output devices include speakers, printers, network interfaces, and monitors.

Graphics display system 470 includes a liquid crystal display or other suitable display device. Graphics display system 470 receives textual and graphical information and processes the information for output to the display device. Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 can be a PC, a handheld computing system, a telephone, a mobile computing system, a workstation, a tablet, a phablet, a mobile phone, a server, a minicomputer, a mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, TIZEN, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 400 may be implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for TCP fast open support in a proxy device have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for TCP fast open support in a proxy device, the system comprising:
at least one circuit associated with the proxy device and configured to:
receive, from at least one client device, at least one SYN packet to establish a connection with at least one server, the at least one SYN packet being associated with the at least one client device and including a cookie, the cookie being generated by the at least one circuit and preliminarily provided to the at least one client device by the at least one circuit during establishing a preceding connection between the at least one server and the at least one client device, the proxy device serving data traffic between the at least one client and a plurality of servers; and
validate the cookie, the validating the cookie including:
acquiring, based on the at least one SYN packet, a first Internet Protocol (IP) address associated with the at least one client device;
decrypting the cookie to obtain a second IP address; and
matching the first IP address and the second IP address; and
at least one data plane associated with the proxy device and communicatively coupled to the at least one circuit, the at least one data plane being configured to:
if the result of the validation is positive, initiate, based on the at least one SYN packet, the connection between the at least one client device and the at least one server of the plurality of servers, wherein the at least one server is not required to provide the TCP fast open support when establishing the connection, the TCP fast open support including performing at least the generation and the validation of the cookie.

2. The system of claim 1, wherein the at least one circuit includes a field-programmed gate array.

3. The system of claim 1, wherein the at least one circuit configured to validate the cookie is further configured to:
acquire a time of generation of the cookie; and
determine whether the time has expired.

4. The system of claim 1, wherein if the result of validation of the cookie is negative, the at least one circuit is further configured to:
  generate, based on the at least one SYN packet, a new cookie;
  send a SYN-ACK packet to the at least one client, the SYN-ACK packet including the new cookie;
  receive an ACK packet from the at least one client, the ACK packet including the new cookie; and
  validate the new cookie.

5. The system of claim 1, wherein the at least one circuit configured to validate the cookie is further configured to:
  determine that the at least one SYN packet includes a cookie request; and
  in response to the determination:
    generate, based on the at least one SYN packet, a new cookie; and
    send a SYN-ACK packet to the at least one client, the SYN-ACK packet including the new cookie.

6. The system of claim 1, wherein the data plane is further configured to manage a queue including the at least one SYN packet.

7. The system of claim 1, wherein the data plane is configured to determine if the at least one SYN packet includes an application data.

8. The system of claim 7, wherein the data plane is further configured to select, based on the at least one SYN packet, the at least one server selected form a list of servers.

9. The system of claim 7, wherein the data plane is further configured to deliver the application data to the at least one server.

10. A method for TCP fast open support in a proxy device, the method comprising:
  receiving, by at least one circuit associated with the proxy device, from at least one client device, at least one SYN packet to establish a connection with at least one server, the at least one SYN packet being associated with the at least one client device and including a cookie, the cookie being generated by the at least one circuit and preliminarily provided to the at least one client device by the at least one circuit during establishing a preceding connection between the at least one server and the at least one client device, the proxy device serving data traffic between the at least one client and a plurality of servers;
  validating, by the at least one circuit, the cookie, the validating the cookie including:
    acquiring, by the at least one circuit and based on the at least one SYN packet, a first Internet Protocol (IP) address associated with the at least one client device;
    decrypting, by the at least one circuit, the cookie to receive a second IP address; and
    matching, by the at least one circuit, the first IP address and the second IP address; and
  if the result of the validation is positive, initiating, by at least one data plane associated with the proxy device and communicatively coupled to the at least one circuit and based on the at least one SYN packet, the connection between the at least one client device and the at least one server of the plurality of servers, wherein the at least one server is not required to provide the TCP fast open support when establishing the connection, the TCP fast open support including performing at least the generation and the validation of the cookie.

11. The method of claim 10, wherein the at least one circuit includes a field-programmed gate array.

12. The method of claim 10, wherein validating of the cookie includes:
  acquiring, by the at least one circuit, a time of generation of the cookie; and
  determining, by the at least one circuit, whether the time has expired.

13. The method of claim 10, further comprising, if the result of validation of the cookie is negative,
  generating, by the at least one circuit and based on the at least one SYN packet, a new cookie;
  sending, by the at least one circuit, a SYN-ACK packet to the at least one client device, the SYN-ACK packet including the new cookie;
  receiving, by the at least one circuit, an ACK packet from the at least one client, the ACK packet including the new cookie; and
  validating, by the at least one circuit, the new cookie.

14. The method of claim 10, further comprising:
  determining, by the at least one circuit, that the at least one SYN packet includes a cookie request; and
  in response to the determination:
    generating, by the at least one circuit and based on the at least one SYN packet, a new cookie; and
    sending, by the at least one circuit, a SYN-ACK packet to the at least one client, the SYN-ACK packet including the new cookie.

15. The method of claim 10, further comprising managing, by the data plane, a queue including the at least one SYN packet.

16. The method of claim 10, further comprising, prior to initiating the connection:
  selecting, by the data plane and based on the at least one SYN packet, the at least one server selected form a list of servers.

17. The method of claim 10, further comprising:
  determining, by the data plane, that the at least one SYN packet includes an application data; and
  delivering the application data to the at least one server.

18. A system for TCP fast open support in a proxy device, the system comprising:
  at least one field-programmed gate array (FPGA) associated with the proxy device and configured to:
    receive, from at least one client device, at least one SYN packet to establish a connection with at least one server, the at least one SYN packet being associated with the at least one client device and including a cookie, the cookie being generated by at least one FPGA and preliminarily provided to the at least one client device by the FPGA during establishing a preceding connection between the at least one server and the at least one client device, the proxy device serving data traffic between the at least one client and a plurality of servers;
    validate the cookie, the validating the cookie including:
      acquiring, by the at least one FPGA and based on the at least one SYN packet, a first Internet Protocol (IP) address associated with the at least one client device;
      decrypting, by the at least one FPGA, the cookie to receive a second IP address; and
      matching, by the at least one FPGA, the first IP address and the second IP address; and
    if the result of validation is negative:
      generate a new cookie; and
      send an ACK packet to the at least one client device, the ACK packet including the new cookie; and at least one data plane associated with the proxy device and communicatively coupled to the at least one FPGA, the at least one data plane being configured to:
if the result of the validation of the cookie is positive:
  select, based on the at least one SYN packet, at least one server selected from a list of servers;
  initiate, based on the at least one SYN packet, the connection between the at least one client device and the at least one server of the plurality of servers, wherein the at least one server is not required to provide the TCP fast open support when establishing the connection, the TCP fast open support including performing at least the generation and the validation of the cookie;
  determine that the at least one SYN packet includes an application data; and
  deliver at least the application data to the at least one server.

* * * * *